United States Patent [19]
Park

[11] Patent Number: 6,056,406
[45] Date of Patent: May 2, 2000

[54] PROJECTION SYSTEM HAVING MULTIPLE SCREENS

[75] Inventor: Jong-bae Park, Suwon, Rep. of Korea

[73] Assignee: Samsung Electronics Co., Ltd., Kyungki-do, Rep. of Korea

[21] Appl. No.: 09/116,821

[22] Filed: Jul. 17, 1998

[30] Foreign Application Priority Data

Aug. 19, 1997 [KR] Rep. of Korea ............... 97-39367

[51] Int. Cl.[7] .................................................. G03B 21/14
[52] U.S. Cl. ............................ 353/94; 353/74; 352/69
[58] Field of Search .......................... 353/30, 94, 74, 353/75; 359/450, 449; 352/69, 70, 71

[56] References Cited

U.S. PATENT DOCUMENTS

| | | | |
|---|---|---|---|
| 3,586,432 | 6/1971 | Pentes, Jr. ............................. | 353/94 |
| 4,597,633 | 7/1986 | Fussell .................................. | 352/69 |
| 4,641,918 | 2/1987 | Moffatt et al. ....................... | 352/69 |
| 5,023,725 | 6/1991 | McCutchen ........................... | 352/70 |
| 5,264,881 | 11/1993 | Brooke ................................. | 353/94 |
| 5,539,483 | 7/1996 | Nalwa .................................. | 353/94 |
| 5,649,827 | 7/1997 | Suzaki ................................. | 353/30 |

*Primary Examiner*—William C. Dowling
*Attorney, Agent, or Firm*—Sughrue, Mion, Zinn, Macpeak & Seas, PLLC

[57] ABSTRACT

A projection system having multiple screens for image display includes at least two screens arranged to form a polygon and a multi-projector comprised of at least two sub-projector units for projecting an image to the rear side of each of the screens. Thus, since multiple screens for displaying an image are disposed in at least two directions, the image can be viewed in various directions.

3 Claims, 3 Drawing Sheets

PROJECTION SYSTEM HAVING MULTIPLE SCREENS

BACKGROUND OF THE INVENTION

1. Field of the Invention

The present invention relates to an image projector and, more particularly, to a projection system having multiple image display screens in a plurality of directions installed outdoors, e.g., on the roof of a building, to display information such as news or advertisements for public viewers.

2. Description of the Related Art

A projector, such as a video projector or a projection TV, forms an image using an image forming means such as a small cathode ray tube (CRT) or liquid crystal display (LCD) and projects the image by magnifying the same onto a large screen via a projection lens. Such projection systems are largely divided into two types, a front-type projector and a rear-type projection system according to the method of projecting the images, i.e., whether the image is projected to the fore side or the back side of the screen.

In the front-type projector, an image is projected to the screen from an image source installed at the front of the screen, whereas the image is projected to the back side of the screen from the image source installed to the rear of the screen in the rear-type projection system.

As shown in FIG. 1, a display apparatus 100 is installed on the roof of a building 10 for displaying advertisements or news to the public. The image is displayed on a large screen 101 using a CRT of red (R), green (G), and blue (B) colors or a multitude of light emitting diodes (LEDs) arranged in a matrix forming pixels.

The conventional display apparatus for outdoor advertisements requires high installation costs in forming a large screen and displays only in one direction which limits viewing from different directions.

SUMMARY OF THE INVENTION

To solve the above problems, it is an object of the present invention to provide a projection system for displaying an image on multiple screens which are disposed in at least two directions so that the image can be viewed in various directions.

Accordingly, to achieve the above object, there is provided a projection system having multiple screens for image display which comprises: at least two screens arranged to form a polygon; and a multi-projector including at least two sub-projector units for projecting an image to the rear side of each of the screens.

Preferably, the projection system according to the present invention further comprises a plurality of light blocking curtains which prevent interference between images projected from each of the sub-projector units to the corresponding screens and are installed between the edges of the respective screens and the multi-projector.

According to another aspect of the present invention, there is provided a projection system having multiple screens for image display which comprises: a pair of screens arranged in different directions with respect to each other; a multi-projector including a pair of sub-projector units for projecting an image to the rear side of each of the screens; a plurality of light blocking curtains which prevent interference between images projected from each of the sub-projector units to the corresponding screens and are installed between the edges of the respective screens and the multi-projector; and an external light blocking panel, installed to connect the edges of each of the screens, for cutting off the external light.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
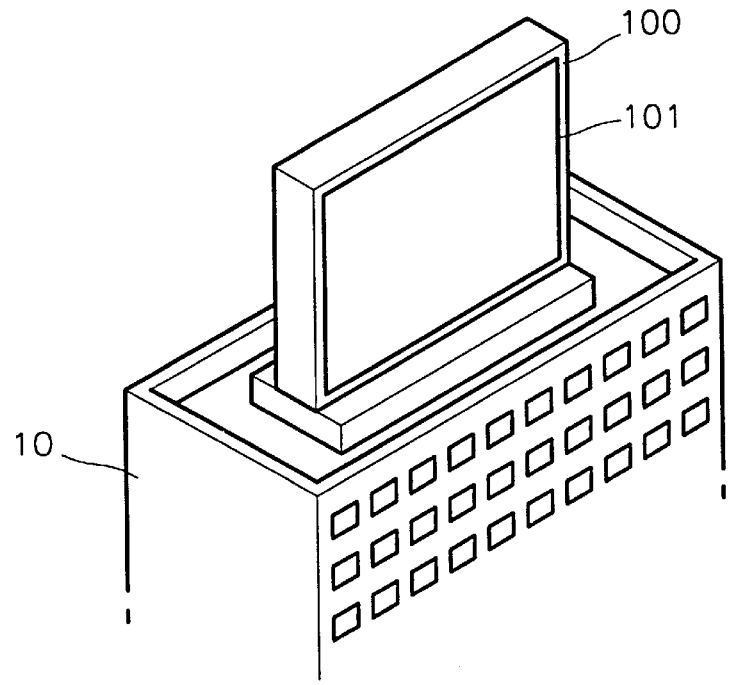
FIG. 1 is a perspective view illustrating a conventional image display apparatus for displaying an image.
Figure 2:
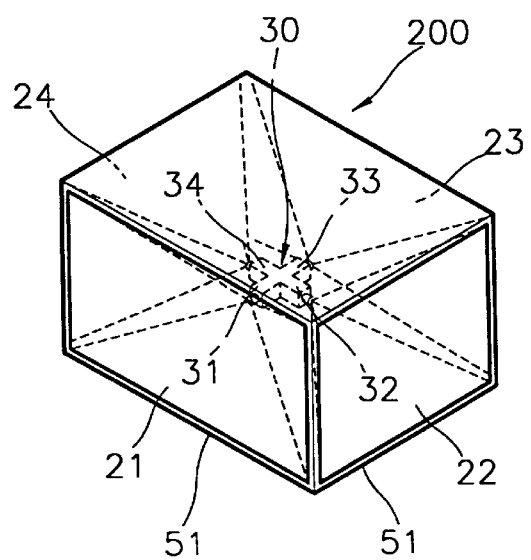
FIG. 2 is a perspective view schematically illustrating a projection system having multiple screens for displaying an image according to a preferred embodiment of the present invention.
Figure 3:
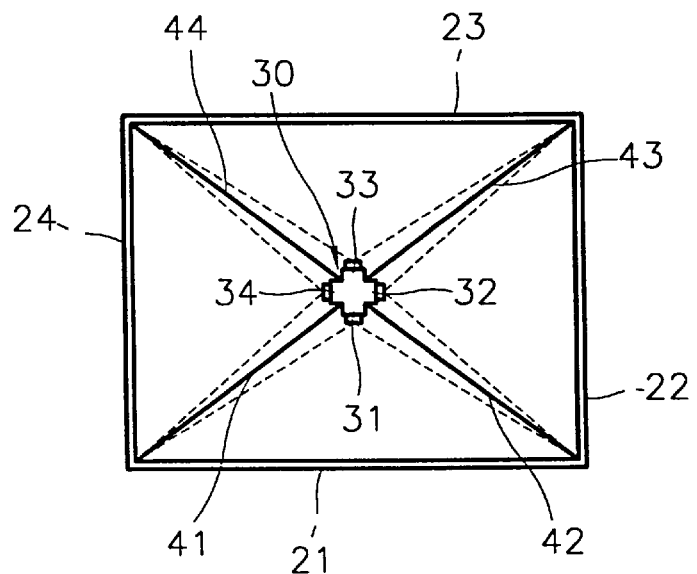
FIG. 3 is a plan view showing the configuration of the projection system shown in FIG. 2.

With reference to FIGS. 2 and 3, a projection system for displaying an image on multiple screens according to a preferred embodiment of the present invention will now be described.

The projection system of the present embodiment is a projection system 200 having a quadruple screen so that the image can be viewed in four directions. The projection system includes four image display screens 21, 22, 23, and 24 which are arranged to form a rectangular space. The respective edges of the screens 21, 22, 23, and 24 are connected to the edges of the neighboring screen.

Also, a multi-projector 30 comprised of sub-projector units 31, 32, 33, and 34 for magnifying and projecting images to the rear sides of the corresponding screens 21, 22, 23, and 24, respectively, is installed at the center of the rectangular space formed by the four screens.

Light blocking curtains 41, 42, 43, and 44 for preventing interference between images projected from the respective sub-projector units 31, 32, 33, and 34 to the corresponding screens 21, 22, 23, and 24 are installed between the edges of the respective screens, connecting portions, and the multi-projector 30.

A common screen for a rear-type projector such as a textile of acrylic resin can be used as the screens 21, 22, 23, and 24, and the edges thereof are supported by a frame 51.

The sub-projector units 31, 32, 33, and 34 include an image forming means such as LCD panels, CRT's or lasers. The image formed by the image forming means is projected via a projection lens (not shown) to the rear side of the respective screens 21, 22, 23, and 24. A range of image projection by the sub-projector units 31, 32, 33, and 34 is indicated by the dashed lines shown in the drawing.

Figure 4:
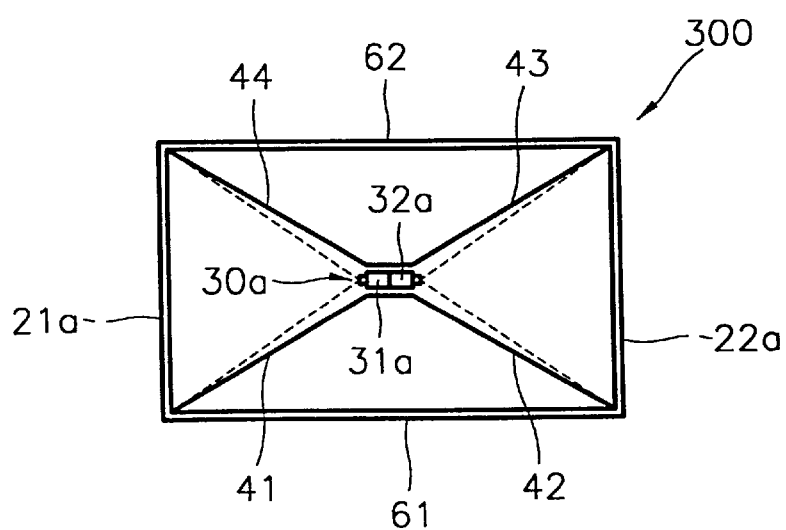
FIGS. 4, 5 and 6 are plan views showing the configurations of projection systems for displaying an image on a double screen, a triple screen and a sextuple screen, respectively, according to preferred embodiments of the present invention.
Figure 5:
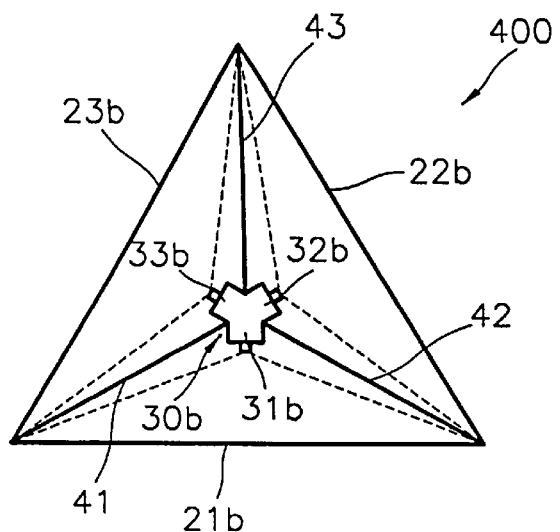
Figure 6:
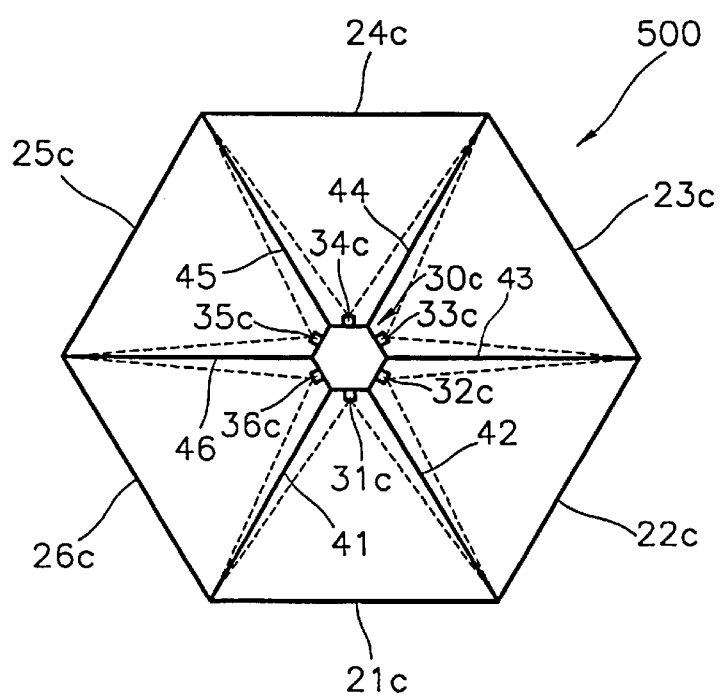

The projection system according to the present invention can be applied according to further number of screens. FIGS. 4 through 6 show projection systems 300, 400, and 500 having a double screen, a triple screen, and a sextuple screen according to further embodiments of the present invention. The same reference numerals indicate the same elements in the drawings.

In FIG. 4, the double screen projection system 300 includes a multi-projector 30a comprised of sub-projector units 31a and 32a for projecting images to the rear side of the opposite screens 21a and 22a. In this case, external light blocking panels 61 and 62 for cutting off the external light are connected to both edges of the screens 21*a* and 22*a*.

In FIG. 5, the triple screen projection system 400 includes a multi-projector 30*b* comprised of sub-projector units 31*b*, 32*b*, and 33*b* for projecting images to the rear side of the three screens 21*b*, 22*b*, and 23*b*, respectively, forming a triangle. Also note the light blocking curtains 41, 42 and 43.

In FIG. 6, the sextuple screen projection system 500 includes a multi-projector 30*c* comprised of sub-projector units 31*c*, 32*c*, 33*c*, 34*c*, 35*c*, and 36*c* for projecting images to the rear side of the six screens 21*c*, 22*c*, 23*c*, 24*c*, 25*c*, and 26*c*, respectively, forming a hexagon. Light blocking curtains 41, 42, 43, 44, 45 and 46 are again installed between the edges of the respective screens and the multi-projector 30*c*.

As described above, in the projection system having multiple screens for image display according to the present invention, the images displayed on the screen can be viewed from at least two directions. Also, installation costs can be reduced compared to the conventional image display apparatus using a small CRT or a plurality of LED's arranged to form pixels.

It is contemplated that numerous modifications may be made to the projection system having multiple screens of the present invention without departing from the spirit and scope of the invention as defined in the following claims.

What is claimed is:

1. A projection system having multiple screens for image display, comprising:

at least two screens arranged to form a polygon, with a front side of each of said screens having a substantially flat surface;

a multi-projector including at least two sub-projector units for projecting an image to a rear side of each of said screens; and a plurality of light blocking curtains which prevent interference between images projected from each of said sub-projector units to a corresponding one of said screens and which are installed between edges of said screens and said multi-projector.

2. A projection system having multiple screens for image display, comprising:

a pair of screens arranged in different directions with respect to each other;

a multi-projector including a pair of sub-projector units for projecting an image to the rear side of each of said screens;

a plurality of light blocking curtains which prevent interference between images projected from each of said sub-projector units to a corresponding one of said screens and are installed between edges of said screens and said multi-projector; and an external light blocking panel, installed to connect the edges of each of said screens, for cutting off external light.

3. A projection system having multiple screens for image display, comprising:

at least two screens arranged to form a polygon;

a multi-projector including at least two sub-projector units for projecting an image to a rear side of each of said screens; and a plurality of light blocking curtains which prevent interference between images projected from each of said sub-projector units to a corresponding one of said screens and which are installed between edges of said screens and said multi-projector.

* * * * *